(12) United States Patent
Chan et al.

(10) Patent No.: US 7,796,880 B2
(45) Date of Patent: Sep. 14, 2010

(54) FLASH DEVICE AND IMAGE CAPTURING DEVICE HAVING SAME

(75) Inventors: Ming-Shan Chan, Taipei Hsien (TW); Pei-Ching Kuo, Taipei Hsien (TW); Sheng-An Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 157 days.

(21) Appl. No.: 12/239,735

(22) Filed: Sep. 26, 2008

(65) Prior Publication Data

US 2009/0290861 A1 Nov. 26, 2009

(30) Foreign Application Priority Data

May 23, 2008 (CN) .................. 2008 1 0301760

(51) Int. Cl.
*G03B 15/02* (2006.01)
*G03B 15/03* (2006.01)
*H04N 5/222* (2006.01)
*H04N 9/04* (2006.01)
*H04N 9/083* (2006.01)
*G02B 5/22* (2006.01)
*F21V 9/00* (2006.01)

(52) U.S. Cl. ............... 396/155; 396/161; 348/270; 348/371; 359/885; 362/17; 362/293

(58) Field of Classification Search .............. 396/155
See application file for complete search history.

(56) References Cited

U.S. PATENT DOCUMENTS

| 2,268,476 | A | * | 12/1941 | Duncan | 340/815.69 |
| 4,333,127 | A | * | 6/1982 | Alkema et al. | 362/17 |
| 5,557,294 | A | * | 9/1996 | Leslie | 345/32 |
| 6,259,864 | B1 | * | 7/2001 | Allen | 396/284 |
| 6,591,022 | B2 | * | 7/2003 | Dewald | 382/274 |
| 2007/0102637 | A1 | * | 5/2007 | Chang et al. | 250/338.1 |

FOREIGN PATENT DOCUMENTS

JP 2000284347 A 10/2000

* cited by examiner

*Primary Examiner*—Melissa J Koval
(74) *Attorney, Agent, or Firm*—Zhigang Ma

(57) ABSTRACT

A flash device includes a flash module and a color wheel. The flash module includes a flash lamp and a trigger circuit for triggering the flash lamp. The color wheel includes a color filter disk. The color filter disk includes a number of filter segments, wherein each of the filter segments is capable of being inserted into the light-emitting path of the flash lamp by rotation the color filter disk.

13 Claims, 4 Drawing Sheets

FLASH DEVICE AND IMAGE CAPTURING DEVICE HAVING SAME

TECHNICAL FIELD

The present invention relates to flash devices and, particularly, to a flash device capable of emitting light with desired color and an image capturing device having the same.

DESCRIPTION OF THE RELATED ART

Image capturing devices, such as film cameras, digital cameras, and mobile phones equipped with a camera module, typically employ a flash device to illuminate an object in low lighting. However, a typical flash device can only emit light with fixed colors, and users cannot vary the color, tone, and color saturation of the object to be photographed.

What is needed, therefore, is a flash device capable of emitting light with desired color and an image capturing device to overcome the above-described problem.

BRIEF DESCRIPTION OF THE DRAWINGS

Many aspects of the present flash device and image capturing device can be better understood with references to the accompanying drawings. The components in the drawings are not necessarily drawn to scale, the emphasis instead being placed upon clearly illustrating the principles of the present flash device and image capturing device.

DETAILED DESCRIPTION OF THE EMBODIMENTS

Embodiments of the present invention will now be described in detail below, with references to the accompanying drawings.

Figure 1:
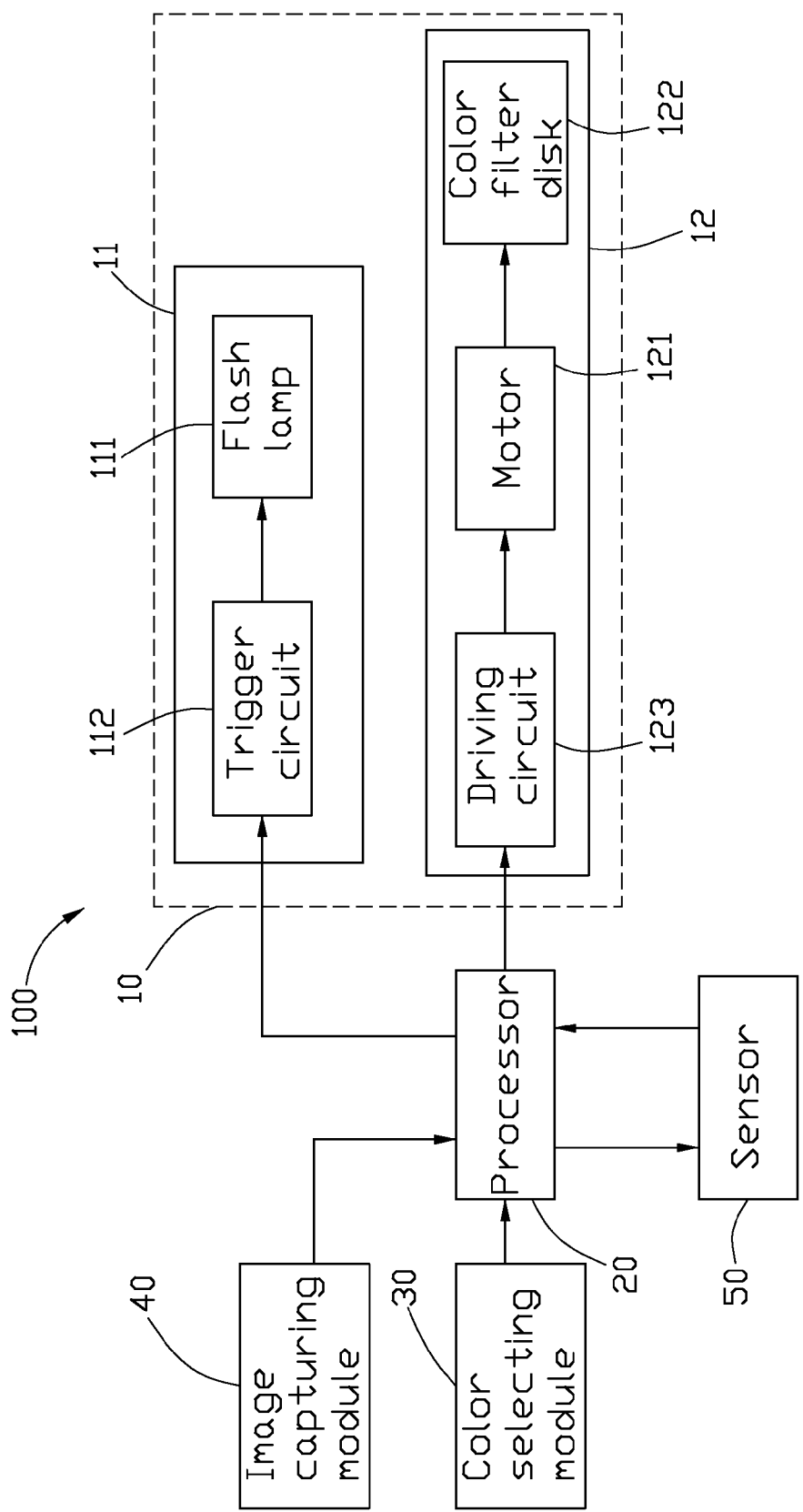
FIG. 1 is a functional block diagram of an image capturing device according to a first exemplary embodiment.
Figure 2:
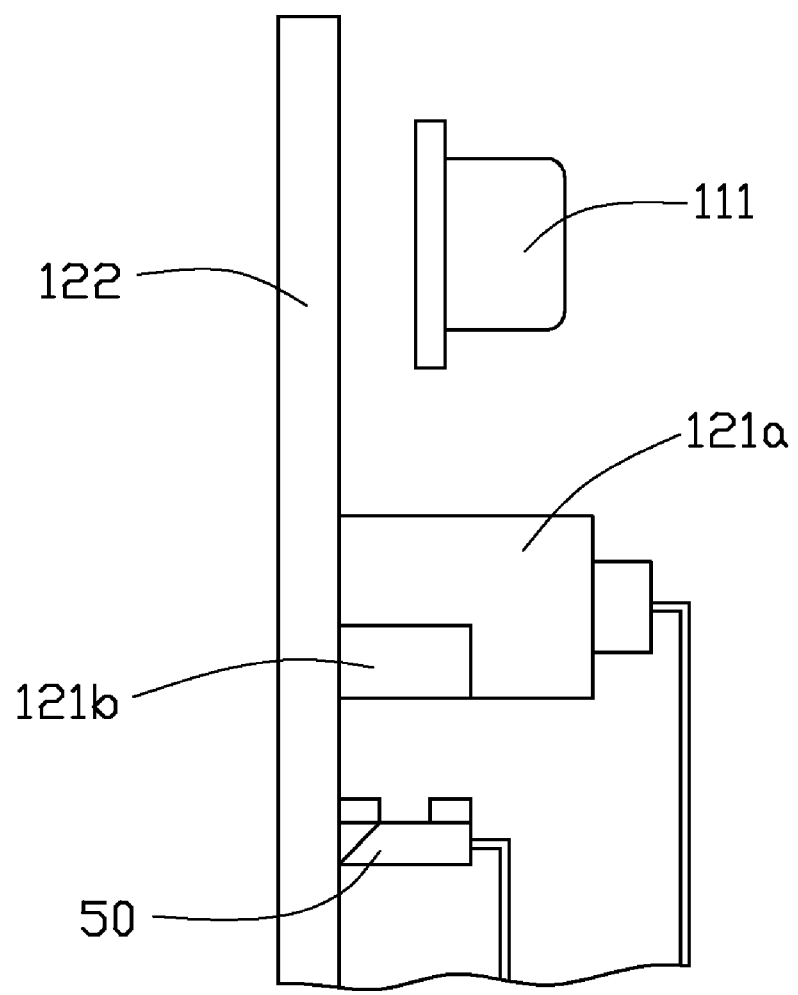
FIG. 2 is a partial, schematic view of a flash device of the image capturing device according to the first exemplary embodiment.

Referring to FIGS. 1 to 2, an image capturing device 100 according to a first exemplary embodiment is shown. The image capturing device 100 includes a flash device 10, a processor 20, a color selecting module 30, an image capturing module 40, and a sensor 50.

The flash device 10 includes a flash module 11 and a color wheel 12. The flash module 11 includes a flash lamp 111 and a trigger circuit 112 for triggering the flash lamp 111. The trigger circuit 112 is electrically connected to the processor 20.

The color wheel 12 includes a motor 121 with a rotating portion 121a, a color filter disk 122 attached to an end of the rotating portion 121a, and a driving circuit 123 for controlling the motor 121. The driving circuit 123 is electrically connected to the processor 20.

The color filter disk 122 is placed on the light emitting path of the flash lamp 111. The color filter disk 122 includes a plurality of sector-shaped filter segments. Each of the sector-shaped filter segments can be inserted into the light emitting path of the flash lamp 111 by rotating the color filter disk 122. In the present embodiment, the color filter disk 122 has a red filter segment, a green filter segment, a blue filter segment, and a white filter segment. The color filter disk 122 is configured for changing the color of the emitting light from the flash lamp 111, and as a result, the color, tone, and color saturation of an object to be photographed can be changed.

Figure 3:
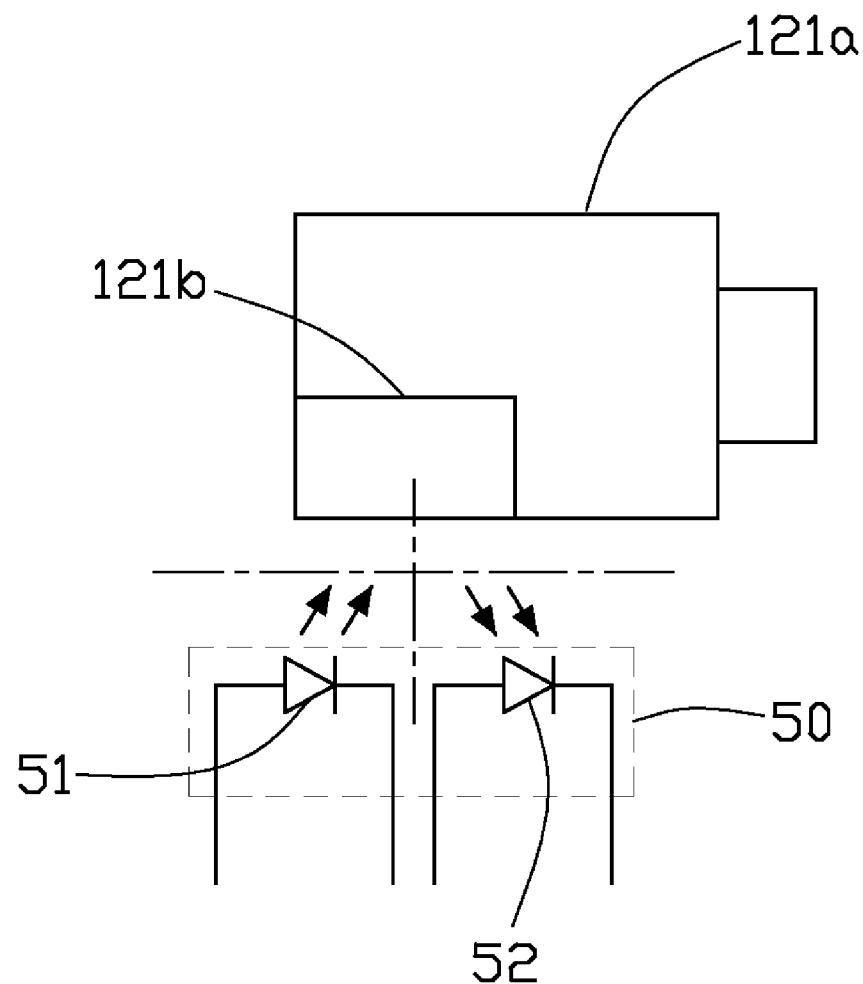
FIG. 3 is a schematic diagram showing the principle of detecting a color index position of a color filter of the flash device of FIG. 2.

The rotating portion 121a of the motor 121 is configured for rotating the color filter disk 122. A timing mark 121b is arranged on a circumferential side surface of the rotating portion 121a. The timing mark 121a is configured to aid the sensor 50 to detect a color index position of the color filter disk 122 mounted on a end surface of the rotating portion 121a during rotation. Referring to FIG. 3, in the present embodiment, the sensor 50 includes a light emitting diode 51 for emitting light towards the rotating portion 121a and an optoelectronic diode 52 for detecting light reflecting from the rotating portion 121a. When portions of light beams from the sensor 51 are projected onto the timing mark 121b of the rotating portion 121a, they are absorbed by the timing mark 121b, allowing the optoelectronic diode 52 to detect the color index position of the color filter disk 122 due to a lack of reflection at the moments the timing mark 121b rotates through the fixed view of the sensor 50. The timing mark 121 can be made of a black or dark light-absorbent medium with low reflectivity.

Referring back to FIG. 1, the color selecting module 30, the image capturing module 40, the sensor 50, the trigger circuit 112, and the driving circuit 123 are connected to the processor 20, respectively. The color selecting module 30 is configured to allow users to select a desired color of light emission from the flash device. The processor 20 is configured for controlling the rotation of the color filter disk 122 by using the motor 121 and the sensor 50 according to the selection of the color selecting module 30. The processor 20 is further configured for controlling the flash module 11 while the image capturing module 40 is capturing an image.

In order to capture an image of an object with a desired color, users can select the desired color of the object by using the color selecting module 30 of the image capturing device 100 first. Then, the processor 20 will rotate the color filter disk 122 by using the motor 121 and the sensor 50 according the selection of the color selecting module 30. Finally, the image capturing module 40 will capture the image of the object while the flash module is emitting light towards the object, and as a result, can get the image of an object with the desired color.

Figure 4:
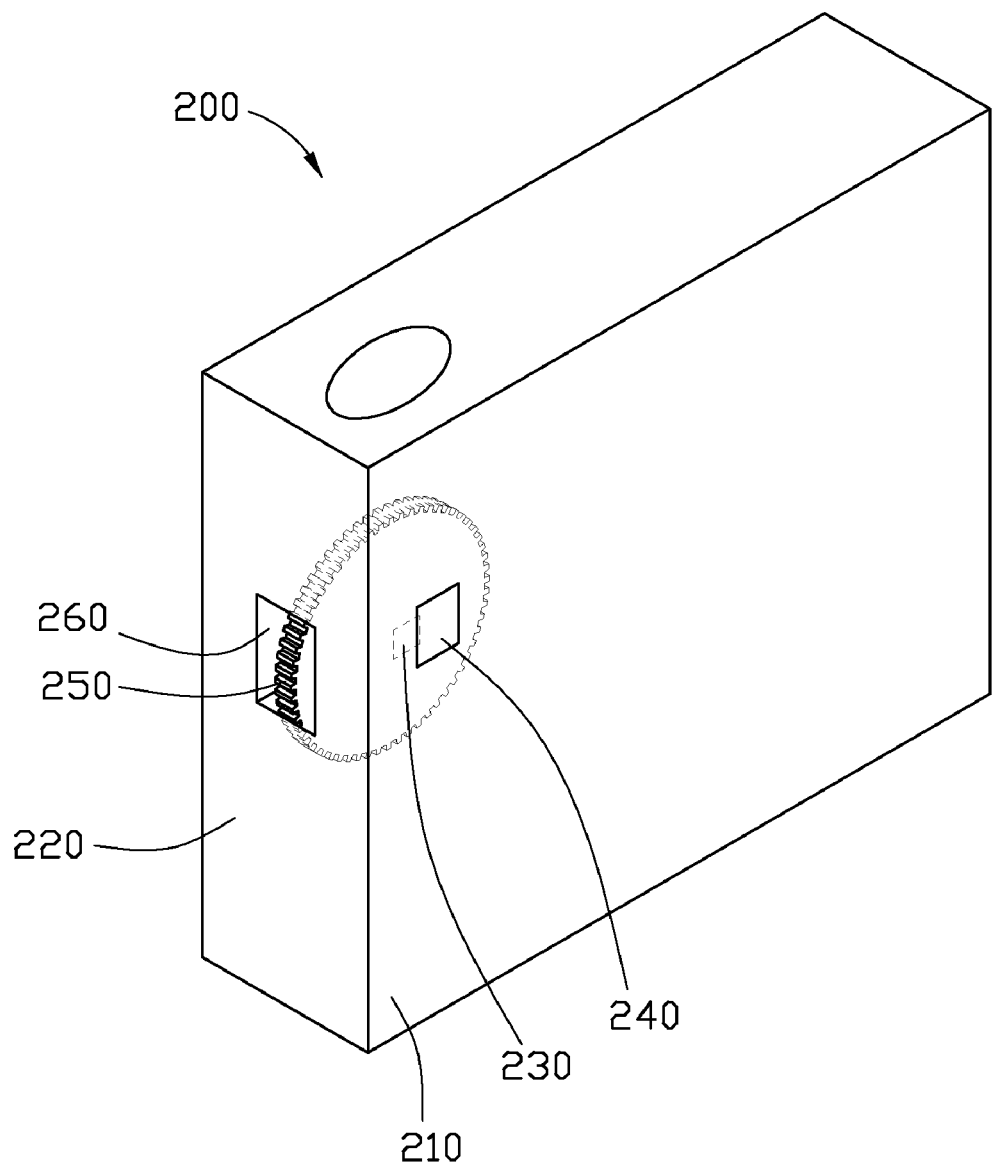
FIG. 4 is a schematic, isometric view of an image capturing device according to a second exemplary embodiment.

Referring to FIG. 4, an image capturing device 200 according to a second exemplary embodiment is shown. The image capturing device 200 includes a front surface 210 facing an object to be photographed, and a side surface 220 adjacent to the front surface 210. The front surface 210 defines an opening 240 corresponding to a flash lamp 230 of the image capturing device 200. A color filter disk 122 is placed on the light emitting path of the flash lamp 230. The difference between the image capturing device 200 and the image capturing device 100 of the first embodiment is that, in the present embodiment, the color filter disk 122 can also be rotated manually. The side surface 220 defines an operating opening 260 for rotating the color filter disk 122 manually thereof. The color filter disk 122 has a toothed circumferential side surface and can partially extend out from the operating opening 260 for ease of operation.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. An image capturing device comprising:
    a flash device comprising:
        a flash module comprising a flash lamp and a trigger circuit for triggering the flash lamp; and
        a color wheel comprising a color filter disk comprising a plurality of filter segments, each of the filter segments being capable of being inserted into the light emitting path of the flash lamp by rotation of the color filter disk,
    an image capturing module for capturing images; and
    a processor electrically connected to the trigger circuit and the image capturing module respectively, the processor being capable of controlling the flash module when the image capturing module captures an image.

2. The image capturing device as claimed in claim 1, wherein the color filter disk is capable of being rotated manually.

3. The image capturing device as claimed in claim 1, wherein the color wheel further comprises a motor with a rotating portion and a driving circuit for controlling the motor, and the color filter disk is attached to an end of the rotating portion.

4. The image capturing device as claimed in claim 3, wherein a timing mark is arranged on a circumferential side surface of the rotating portion for aiding in detecting the color index position of the color filter disk.

5. The image capturing device as claimed in claim 4, wherein the timing mark is made of a black or dark light-absorbent medium with low reflectivity.

6. The image capturing device as claimed in claim 1, wherein the plurality of filter segments are sector-shaped filter segments.

7. The image capturing device as claimed in claim 1, wherein the plurality of filter segments comprise a red filter segment, a green filter segment, a blue filter segment, and a white filter segment.

8. An image capturing device comprising:
    a flash device comprising:
        a flash module comprising a flash lamp and a trigger circuit for triggering the flash lamp; and
        a color wheel comprising a color filter disk, a motor for rotating the color filter disk, and a driving circuit for controlling the motor, the color filter disk comprising a plurality of filter segments, each of the filter segments being capable of being inserted into the light emitting path of the flash lamp by rotation of the color filter disk,
    a sensor capable of detecting a color index position of the color filter disk;
    a color selecting module capable of selecting a desired color of emitting light of the flash device by users;
    an image capturing module for capturing images; and
    a processor electrically connected to the trigger circuit, the driving circuit, the sensor, the color selecting module, and the image capturing module respectively, the processor being capable of control the rotation of the color filter disk by using the motor and the sensor according to the selection of the color selecting module, and controlling the flash module during the image capturing module capturing an image.

9. The image capturing device as claimed in claim 8, wherein the color filter disk is capable of being rotated manually.

10. The image capturing device as claimed in claim 8, wherein the motor comprises a rotating portion and the color filter disk is attached to an end of the rotating portion.

11. The image capturing device as claimed in claim 10, wherein a timing mark is arranged on a circumferential side surface of the rotating portion for aiding in detecting the color index position of the color filter disk.

12. The image capturing device as claimed in claim 11, wherein the timing mark is made of a black or dark light-absorbent medium with low reflectivity.

13. The image capturing device as claimed in claim 8, wherein the plurality of filter segments are sector-shaped filter segments.

* * * * *